United States Patent [19]
Kleiber

[11] 3,905,163
[45] Sept. 16, 1975

[54] LENS MAKING METHOD
[75] Inventor: Joseph P. Kleiber, Newark, N.Y.
[73] Assignee: Tropel, Inc., Fairport, N.Y.
[22] Filed: Mar. 6, 1974
[21] Appl. No.: 448,685

[52] U.S. Cl.................................. 51/284; 51/323
[51] Int. Cl.².................... B24B 1/00; B24B 13/02
[58] Field of Search............. 51/284, 283, 5 R, 5 B, 51/5 C, 3, 323

[56] References Cited
UNITED STATES PATENTS
| | | | |
|---|---|---|---|
| 3,030,859 | 4/1962 | Elliott | 51/284 X |
| 3,032,936 | 5/1962 | Voice | 51/284 UX |
| 3,064,531 | 11/1962 | Bullock | 51/284 X |
| 3,686,796 | 8/1972 | Clark | 51/284 X |
| 3,750,272 | 8/1973 | Gomond | 51/284 X |

Primary Examiner—Donald G. Kelly
Attorney, Agent, or Firm—Stonebraker, Shepard & Stephens

[57] ABSTRACT

Lenses are made from plates of solid optical material thicker than the lenses and having plane opposite face surfaces, and the plates are held relatively still during the process. Tools are moved to cut away annular grooves in the plate to form any necessary clearance for subsequent tool motions, and then other tools are moved to cut away material from within the grooves to form curved surfaces for the lenses, and the curved surfaces are recessed relative to the plane surfaces of the plate. The curved surfaces are polished by other tools, and the lenses are preferably tested and coated while still in the plate. Finally, the lenses are cut out of the plate and mounted.

22 Claims, 19 Drawing Figures

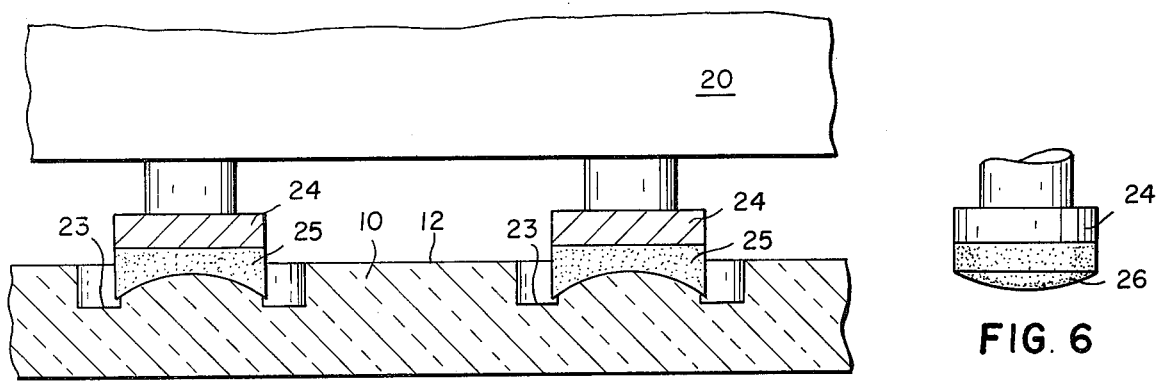
FIG. 5
FIG. 6
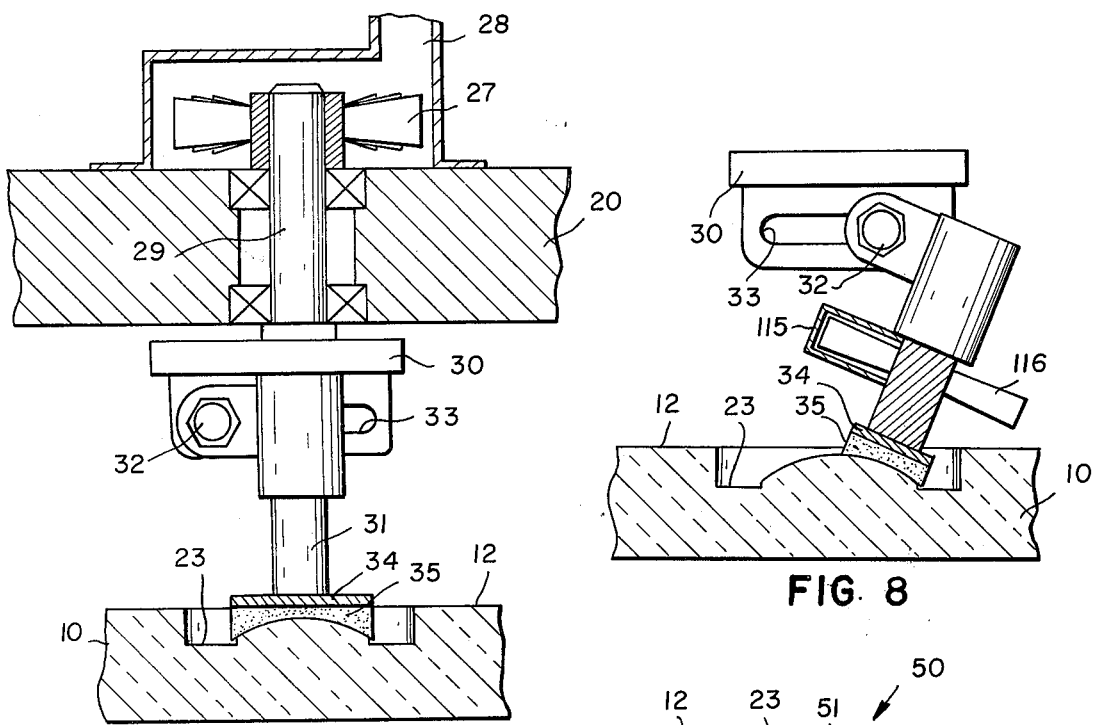
FIG. 7
FIG. 8
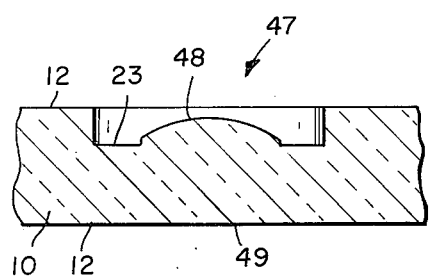
FIG. 10
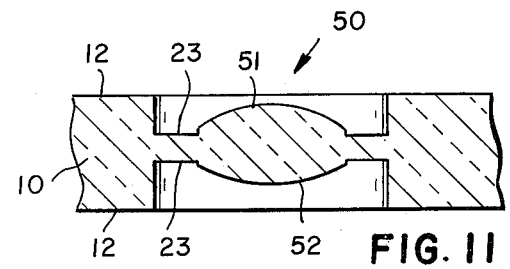
FIG. 11
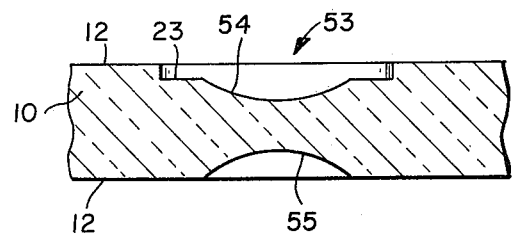
FIG. 12

LENS MAKING METHOD

THE INVENTIVE IMPROVEMENT

Lens manufacture has long required much skill and time, and lenses have been made generally from individual pieces of glass that are rough-shaped, accurately mounted in fixtures, and ground and polished in equipment that rotates both the lenses and polishing heads. Great accuracy is often required, and yet the handling and mounting of many individual lenses during the different stages of grinding and polishing allows many possibilities for errors. Furthermore, the necessary equipment requires a large space and a large capital investment for producing lenses in large quantities.

The invention involves a realization of a way that lenses can be mass produced by forming lenses from the material of fixed optical plates by using tools that are moved relative to the plates. Since the lenses are integral with the plates they cannot be rotated for grinding and polishing in such a process, but the invention recognizes ways for moving grinding and polishing tools over stationary lenses to achieve the desired accuracy. The invention recognizes many ways to accomplish savings in handling, inspecting, coating and mounting lenses supported integrally within plates, and the invention aims at economy and accuracy in mass production of lenses.

SUMMARY OF THE INVENTION

The inventive method of making lenses begins with forming solid, optical plates thicker than the lenses and having plane opposite face surfaces. The plates are often formed of glass and are sometimes referred to as "glass" in the specification, but they can also be formed of quartz, germanium, and other materials that transmit different wavelengths of radiation in or outside the visible spectrum. The plates are held still while tools are moved to cut away annular grooves to form any necessary clearance for subsequent tool motions, and then material is cut away from the plates to form curved surfaces for the lenses, with the curved surfaces being recessed relative to the plane surfaces of the plate. The curved surfaces are polished, and if opposite curved surfaces are desired, the grooving, cutting away of material, and polishing is repeated for the other side of the plate in registry with the first side of the plate to form both surfaces of the lenses. Then, preferably after inspecting and coating the lenses as a group, they are cut from the plate and mounted.

DRAWINGS

FIG. 5 is a fragmentary, partially schematic, elevational cross-sectional view of tools forming curved surfaces for lenses;

FIG. 6 is a fragmentary elevational view of an alternatively shape of tool for the work shown in FIG. 5;

FIGS. 7-9 are partially schematic, and partially cross-sectioned, elevational views of tools for grinding and polishing relatively fixed lens surfaces;

FIGS. 10-12 show cross sectional views of some of the many lens shapes that can be formed from a plate according to the invention;

DETAILED DESCRIPTION

Figure 1:
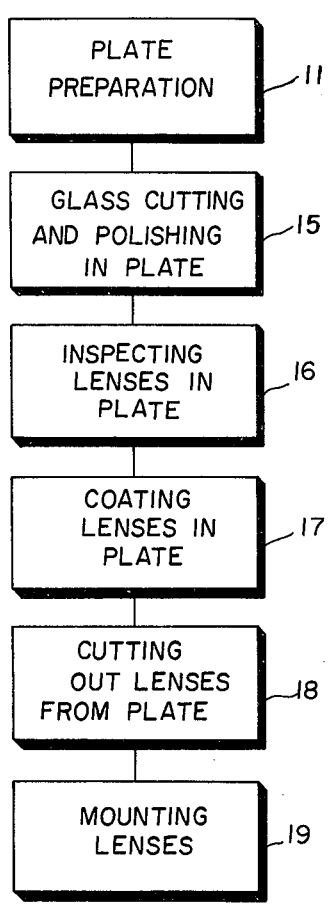
FIG. 1 is a schematic block diagram of preferred steps for the inventive method.
Figure 2:
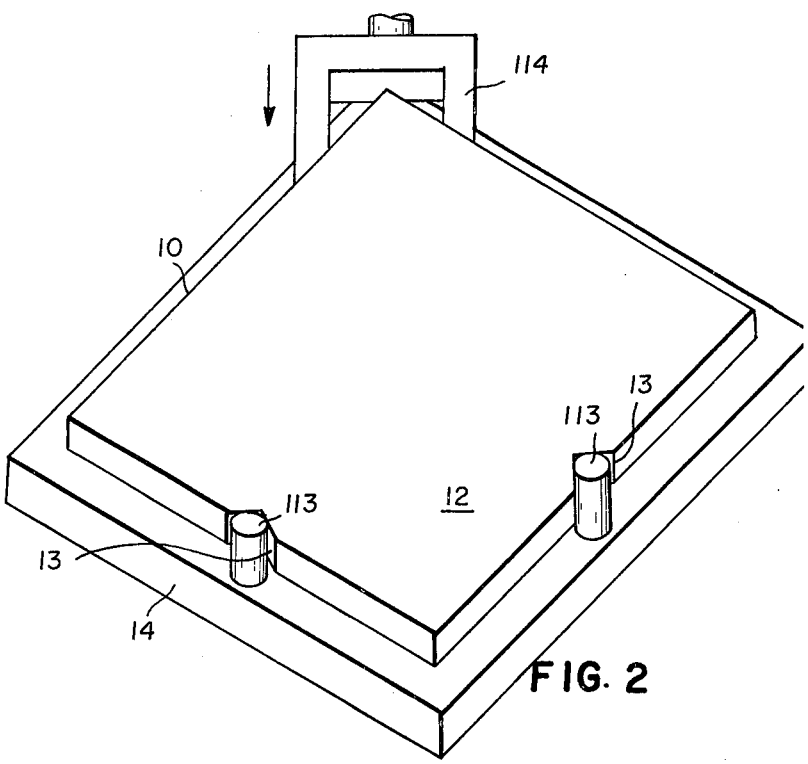
FIG. 2 is a perspective view of an optical plate mounted on a fixture and supplying the material for making lenses.

The inventive method makes optical lenses for instruments or equipment having optical systems, and it differs from prior art methods in forming lenses from relatively fixed, solid optical plates. A single, relatively large lens can be made from each plate, or a plurality of preferably identical lenses can be formed in each plate. The general steps of the method are shown schematically in FIG. 1 and begin with plate preparation 11, which includes selecting a plate of the proper size and material for the lenses to be formed. Such a plate 10 is shown in FIG. 2 and suitable plates can be square, rectangular, circular, or have other shapes. Preferably plates 10 are ground or polished to have plane and parallel opposite face surfaces 12. Also, since plates 10 are preferably held in fixtures and moved about during the inventive method, they preferably have location notches 13 engaged by pins 113 of fixture 14 to be held securely in place under pressure of fixture clamps 114.

The next step 15 is cutting away material from one of the face surfaces 12 of plate 10 to form lenses in plate 10. For any lens surface shape that requires clearance for subsequent movement of tools, the first glass cutting step is preferably cutting an annular groove around each region of plate 10 where a lens is to be formed. Then the lens surface is shaped and polished within the annular goove, and the process is repeated on the opposite face of plate 10 in registry with the shaping made on the first face to produce both surfaces of each lens.

The lenses formed in plate 10 are preferably inspected and coated as a group in steps 16 and 17 before the lenses are removed from plate 10. When all the possible handling and processing of the lenses is completed, and the lenses are ready for use, they are cut from plate 10 in step 18 and mounted in a lens assembly in step 19.

FIG. 2 has been discussed briefly above and schematically shows a fixture 14 having a clamp 114 for holding notches 13 of optical glass plate 10 securely against pins 113. There are many ways to arrange location notches 13 on plate 10 to fit many different fixtures for accurately locating and securely holding plates 10 in place for various operations in the inventive method. Location notches 13 can be used not only for holding plates 10 during cutting, grinding, and polishing operations, but also during lens inspecting and coating, and during the cutting out of finished lenses.

Plates 10 and fixtures 14 are preferably indexed through processing stations in practicing the inventive method, and tooling is arranged at each processing station to accomplish the desired steps in sequence for making lenses. Each station preferably includes many identical tools for operating simultaneously on the regions of plates 10 where lenses are to be formed, and examples of such tooling are shown in FIGS. 3 and 5–9. Such tools are preferably mounted for rotation in tool-holding blocks 20, and the tools preferably all use diamond cutting surfaces properly selected for each operation.

Figure 4:
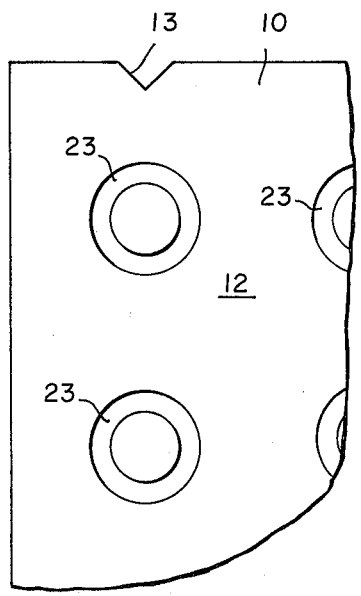
FIG. 4 is a fragmentary plan view of grooves cut by the tools shown in FIG. 3.
Figure 3:
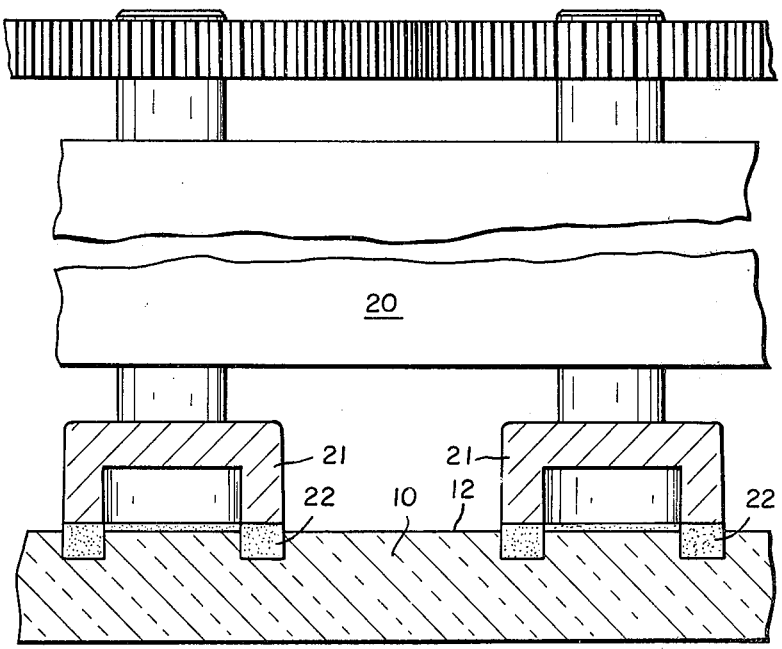
FIG. 3 is a fragmentary and partially schematic cross-sectional view of tools cutting grooves around lenses to be made in a plate.

Tools 21 of FIG. 3 have circular diamond cutting edges 22 that are rotatably driven into regions of the top surface 12 of glass plate 10 to form circular grooves 23 as shown in FIG. 4. Each groove 23 encircles a region of plate 12 in which a lens surface is to be formed, and grooves 23 provide clearance around the lens surface for subsequent tool motion. For concave lens surfaces, grooves 23 are not necessary, since subsequent tooling can move over a concave surface without requiring any clearance around it, and grooves 23 are omitted, except where needed.

The next step is coarse generating of the approximate curvature of the lens surface to be formed in each region of plate 10, and tools 24 having diamond cutting faces 25 are preferred for this as shown in FIG. 5. The cutting of grooves 23 and the generating of curves by tools 25 are relatively coarse, brute-force operations that remove glass fairly quickly. Hence, diamond tools 22 and 25 are preferably relatively coarse and strong to accomplish their tasks quickly.

Tool 24 as shown in FIG. 6 has a diamond cutting head 26 for shaping a concave lens surface. Any sort of lens surface that can be formed by a rotatable tool moved in a desired pattern can be made by the inventive method, and cutting heads 25 and 26 merely illustrate two different possibilities.

The next steps are fine generating and grinding of the lens surface to the desired shape, and FIGS. 7 and 8 illustrate some of the tooling possibilities for accomplishing this. Since grinding tools require relatively high accuracy, they are preferably hydraulically driven as schematically shown in FIG. 7. Liquid forced through line 28 drives turbine 27 for turning spindle 29 in tool block 20, and spindle 29 rotates a plate 30 carrying a tool shaft 31. A panetary gear drive can be substituted for plate 30 for driving tool shaft 31 axially with spindle 29, and angular adjustment of shaft 31 can be provided by a bolt 32 adjustably secured in slot 33 as is apparent in comparing FIGS. 7 and 8. Adjusting the angle of tool 35 relative to the lens surface is important for accuracy and can be accomplished in many other ways including automatic control devices. When axially aligned with spindle 29 as shown in FIG. 7, grinding head 35 rotates concentrically with the surface to be ground, but when set at an angle as shown in FIG. 8, grinding head 35 orbits around the lens surface. Tool shaft 31 or tool head 34 can be rotatably mounted for turning as it orbits around the lens surface in the pattern of FIG. 8. One preferred way of dong this is with turbine blades 116 secured to rotatable shaft 31 and partially shielded by housing 115 to rotate shaft 31 axially as shaft 31 orbits around in a liquid environment. Also, cutting heads 35 are preferably constructed with diamond material arranged in an appropriate pattern to cooperate with the movement of the tool for evenly grinding the lens surface.

Figure 9:
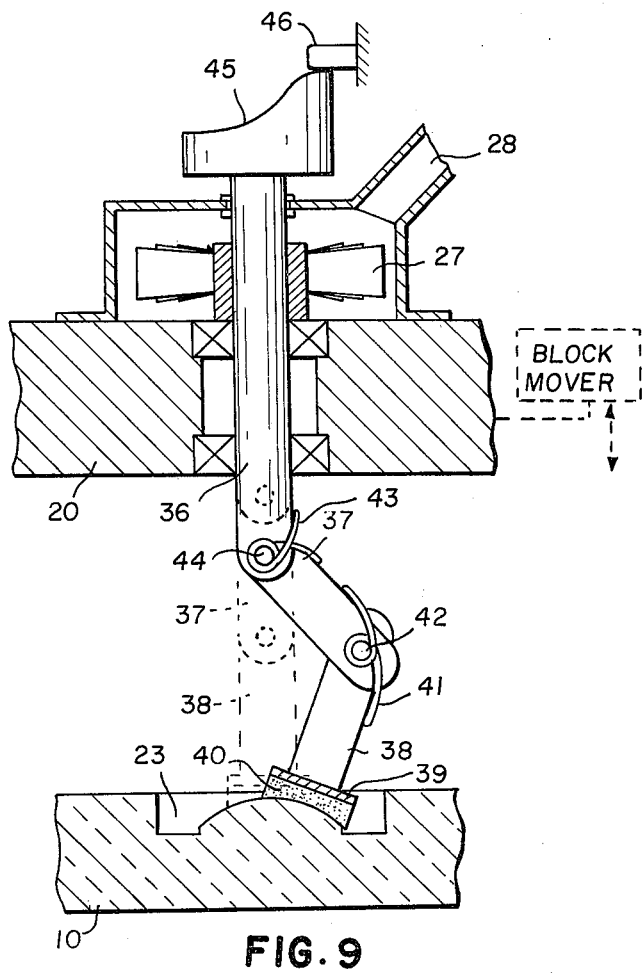

The next step is polishing the lens surfaces, and FIG. 9 shows one of many possible tools for accomplishing this. Hydraulic drive through line 28 to turbine 27 is used as previously described for turning spindle 36, and a pivot arm 37 extends from the bottom of spindle 36 to a tool shaft 38 carrying polishing tool 39 with a polishing head 40. Springs 41 and 43 are wrapped respectively around pivot pins 42 and 44 to bias arms 37 and 38 and spindle 36 from the illustrated solid-line position to the broken-line position. This urges spindle 36 upward to engage a cam surface 45 at the top of spindle 36 with a fixed cam follower 46 so that the upward travel of spindle 36 is limited by cam 45. Then as spindle 36 rotates, lever 37 and tool shaft 38 pivot in and out to move polishing head 40 radially in and out as it rotates around the lens surface. Tool 39 and polishing head 40 can also be made to rotate during their orbital motion, and blades 116 and housing 115 of FIG. 8 can be used to accomplish this. Cam 45 and follower 46 can be given various shapes to cooperate with the motion of polishing head 40 to insure even motion of polishing head 40 over the entire surface to be polished, and since the desired motion is random, cam 45 can be loosely mounted on spindle 36. Another way to accomplish the desired in-and-out movement of tool 40 as it orbits around the lens is to move tool block 20 up and down as schematically shown in FIG. 9. Numerical control can be used for this, and the movement of block 20 can be made random for even travel of tool 40 over the entire lens surface.

After finishing all the lens surfaces formed in one face surface of plate 10, then plate 10 is turned over and the process is repeated on the other face surface 12 to form the opposite surface of each of the lenses, unless the opposite lens surface is plane and can be part of the opposite face surface 12 of plate 10. The operations on the second side of plate 10 are registered with the formations made on the first side to form completed lenses having opposite surfaces on the same optical axis. Also, each curved surface of each lens is recessed relative to its respective face surface 12 of plate 10, and this has several advantages. Plates 10 can be stacked on top of one another, and laid down on flat surfaces or secured to flat fixtures without danger of scratching or marring lens surfaces which are recessed relative to each face surface 12 of plate 10 and do not come in contact with plane surfaces engaging surfaces 12 of plates 10. So in addition to processing many lenses at one time in plates 10, the lens handling need not be quite so careful as in prior art methods.

An endless variety of lenses can be made by the inventive method from plates 10, and FIGS. 10–12 illustrate three examples. Many different numbers of lenses can be formed on each plate, different sized lenses can be made, and depending upon the lens output to be made, equipment can be designed to process a tremendous variety of lenses formed from plates. Lens 47 of FIG. 10 is a plan-convex lens formed from plate 10 with an annular groove 23 around the convex surface 48 of lens 47 to accommodate tool motions. The plane side 49 of lens 47 is formed as a part of the polished surface 12 of plate 10. Lens 50 of FIG. 11 has two convex surfaces 51 and 52 each surrounded by an annular groove 23 and each recessed relative to a face 12 of plate 10. Lens 53 of FIG. 12 has one concave surface 54 surrounded by an annular groove 23, and another concave surface 55 not surrounded by an annular groove. Groove 23 around surface 54 of lens 53 can be used to adjust the thickness of glass surrounding lens 53 for mounting or lens spacing purposes. Many other combinations of lens surfaces can also be made by the inventive method.

Lens processing operations are preferably completed before the lenses are cut out of plate 10. This includes inspection and testing and lens coating operations that are done in generally known ways, except for processing all the lenses in a plate 10 as a group to achieve advantages in increased speed and efficiency. Plate 10 from which the lenses are formed provides a convenient mount for such testing and coating operations and protects the lens surfaces which are recessed relative to plate 10.

Figure 13:
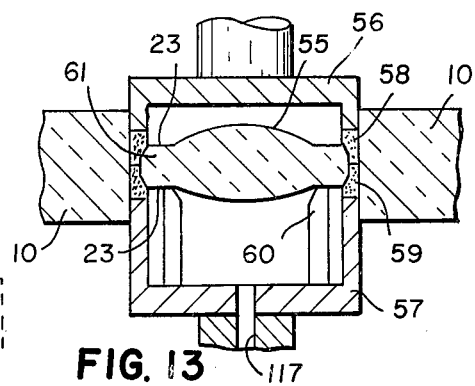
FIG. 13 is a partially schematic, cross-sectional view of one of several preferred ways of cutting finished lenses from a plate.

After the lenses in plate 10 are processed as completely as possible, plates 10 are relocated in fixtures so that a plurality of cutting tools can cut the individual lenses out of plate 10, and one preferred way of doing this is shown in FIG. 13. A pair of opposed, diamond cutting tools 56 and 57 having registered annular cutting edges 58 and 59 are driven into opposite surfaces of grooves 23 around lens 55 to cut lens 55 free from plate 10. A holder 60 extends upward inside of tool 57 to support lens 55 while it is cut away from plate 10, and a vacuum applied through opening 117 holds lens 55 to holder 60. After lens 55 is cut out of plate 10, it preferably retains an integral glass rim 61 of the glass left between grooves 23. Rim 61 is useful in mounting lens 55 as explained below; however, rim 61 can also be cut off if desired.

Figure 14:
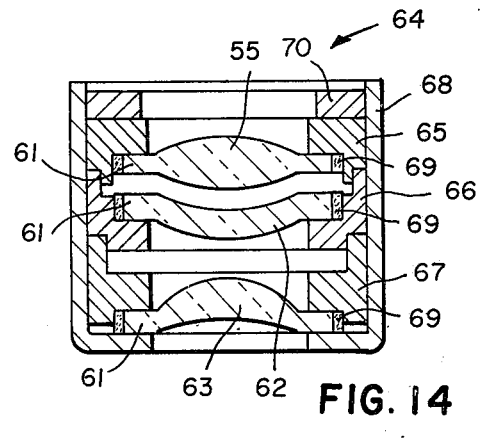
FIG. 14 is a cross-sectional view of one of many preferred ways of mounting lenses made according to the invention.
Figure 15:
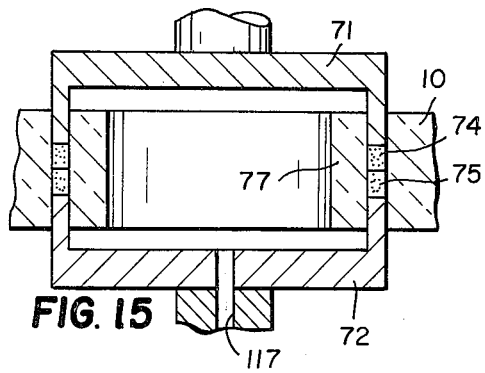
FIG. 15 is a partially schematic, cross-sectional view of one preferred way of cutting out a spacer ring around the region of a plate where a lens has been formed and cut out.

Lens 55 is shown incorporated with lenses 62 and 63 in a lens assembly 64 in FIG. 14, and rims 61 around each lens are mounted in cooperation with mounting cells 65–67 in a housing 68 and secured in place with cement 69 as illustrated. A retainer ring 70 holds the lens assembly in housing 68. There are many different ways that mounting cells 65–67 can be shaped for receiving rims 61 of lenses, and many ways that lenses can be centered and optically aligned relative to cells for mounting in housing 68. Rims 61, which are not found on lenses made by prior art methods, are quite useful in mounting and aligning lenses, especially since rims 61 are accurately concentric with their respective lenses.

Figure 16:
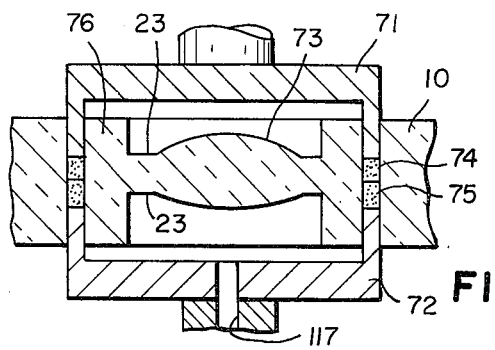
FIG. 16 is a partially schematic, cross-sectional view of one preferred way of cutting out lenses having integral spacer rings.

FIG. 16 shows another way of cutting out lenses made by the invention to produce a spacer ring useful in mounting the lenses in an assembly. A pair of circular, registered cutters 71 and 72 having diameters larger than grooves 23 around lens 73 have cutting edges 74 and 75 that are driven into plate 10 in annular cuts concentric with lens 73 to cut off a spacer ring 76 along with lens 73. Ring 76 surrounds lens 73 and extends radially outward from lens 73 and grooves 23, and ring 76 has the same thickness as original plate 10. Ring 76 can then be used as a spacer in mountng lens 73, and the availability of ring 76 as a spacer is preferably considered in designing lens 73 to simplify lens mounting and assembly.

A spacer ring 77 for similar lens spacing purposes can be cut from the glass of plate 10 surrounding the region where a lens was made and cut out. The same tools 71 and 72 can cut out ring 77, so long as the lenses were properly spaced in plate 10 to leave an adequate ring of glass around each lens formation. Then spacer ring 77 can be used in a lens assembly for spacing adjacent lenses apart.

Figure 17:
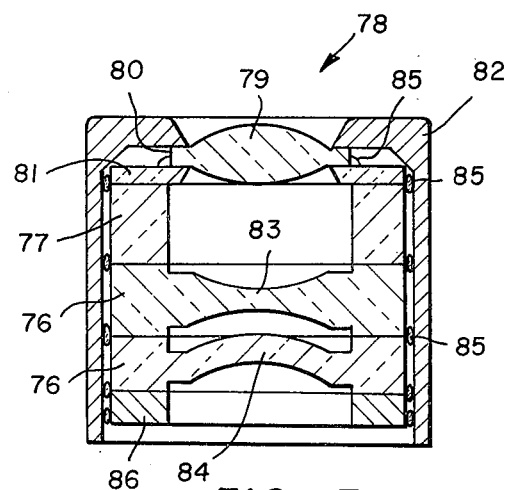
FIG. 17 is a cross-sectional view of a preferred way of mounting lenses made according to the invention.

Lens assembly 78 of FIG. 17 illustrates a few of the ways that lenses can be assembled with spacer rings. Lens 79 has a peripheral mounting rim 80, and a support and spacer ring 81 mounts lens 79 in place in housing 82. Spacer ring 77, preferably cut out from around lens 79, separates support ring 81 and spacer ring 76 of another lens 83, and adjacent lens 84 is spaced from lens 83 by engagement of respective spacer rings 76. Lens rims and spacer rings are preferably secured together by cement 85 after lenses are optically aligned so they can be retained in non-precision housing 82 by a retainer ring 86 for generally reducing the expense of assembling and housing the lenses. If the thickness of the plate 10 from which the lenses are made is considered in the lens design, then spacer rings 76 and 77 can be readily made for simplifying the lens assembly, and many different mountings and housings can be used economically.

Figure 18:
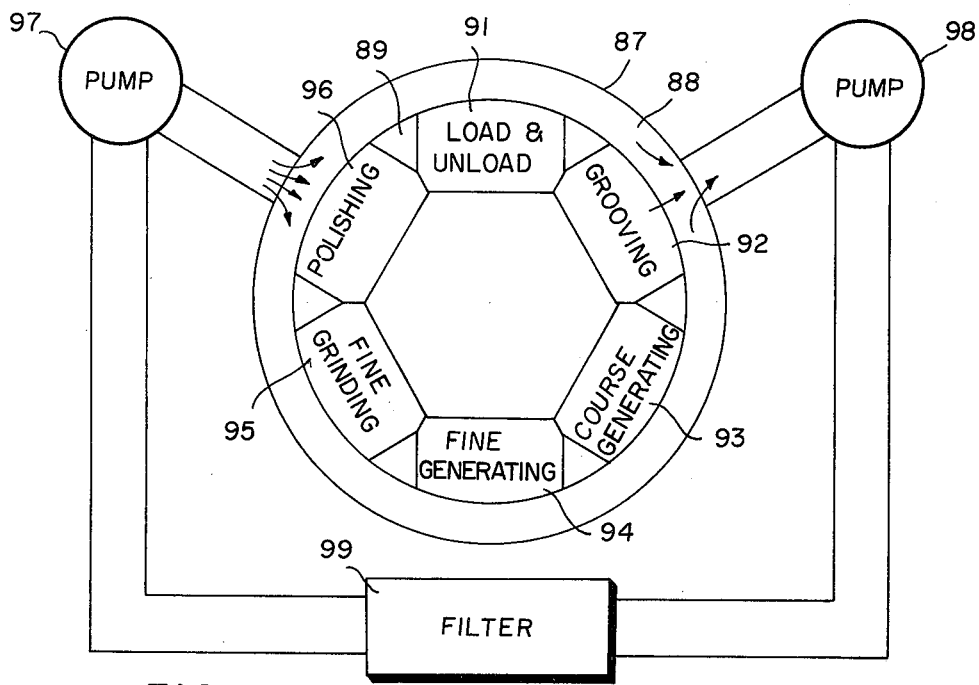
FIG. 18 is a schematic plan view of a preferred way of practicing the inventive method.
Figure 19:
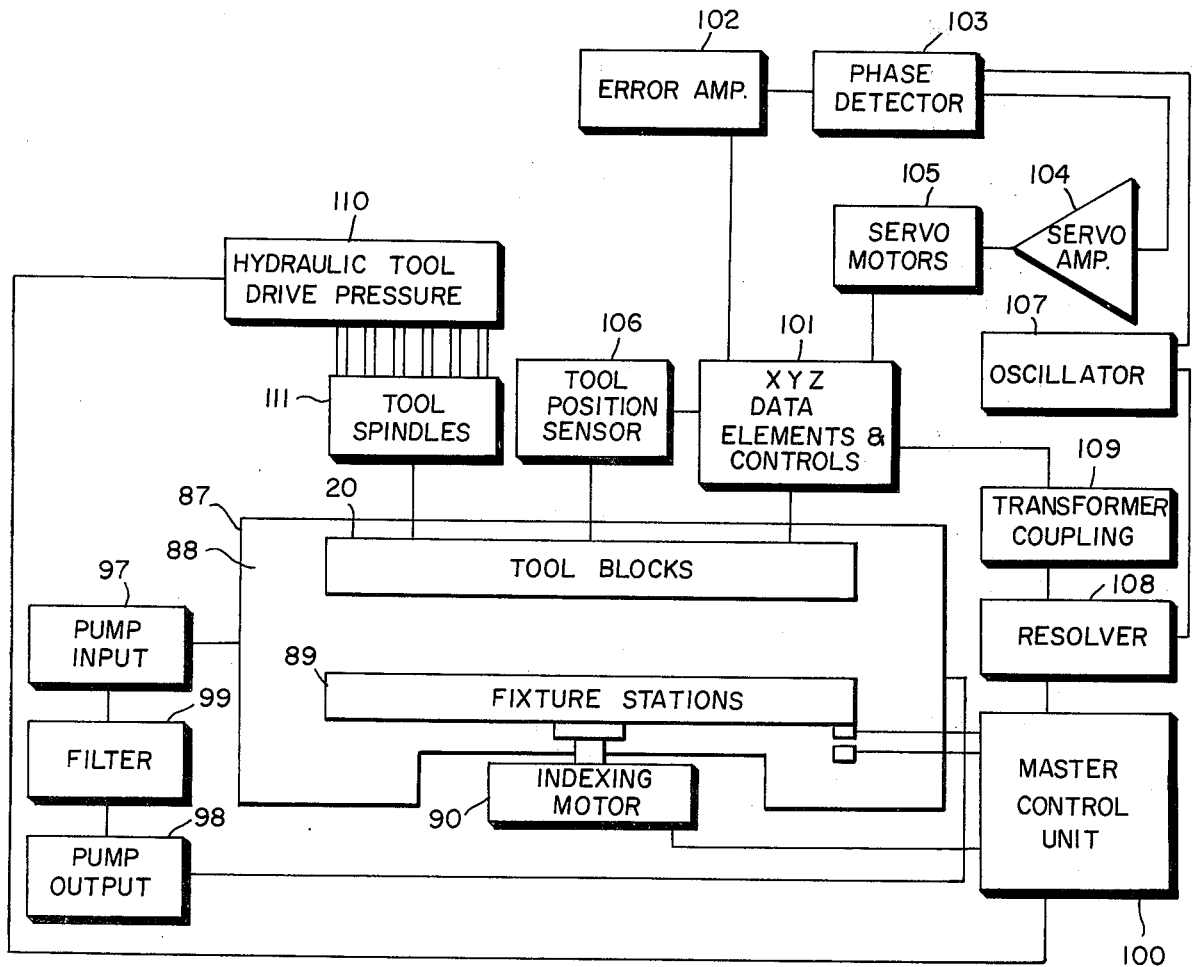
FIG. 19 is a schematic diagram of a preferred control system for practicing the inventive method.

One preferred way of practicing the inventive method is to perform all the glass cutting, grinding, and polishing operations within a tank 87 filled with liquid 88 as schematically shown in FIGS. 18 and 19. Liquid 88 not only cools and lubricates the cutting and grinding operations, but also rinses away grit or waste products to keep the operations clean. Liquid 88 allows use of efficient, diamond charged cutting and polishing tools for faster glass removal and tool operation than was possible in prior art methods.

An indexing mechanism 89 driven by an indexing motor 90 is arranged in tank 87 to hold fixtures clamping plates in place for indexing through stations in tank 87 for forming lenses from plates 10. Many different stations can be used, depending on the lenses to be made and the accuracy of the results desired, and FIG. 18 illustrates one preferred example of a loading and unloading station 91, a station 92 for initial cutting of grooves 23 such as shown in FIG. 3., a station 93 for coarse curve generating such as shown in FIG. 5, station 94 for fine curve generating as shown in FIG. 7, and station 95 for fine grinding as shown in FIG. 8, and a final polishing station 96 for polishing the lens surfaces as described relative to FIG. 9. Of course, additional or fewer stations can be used, the tasks at each station can be made different, and different tooling can be used at any station.

An input pump 97 pumps liquid 88 into tank 87 preferably in the region of polishing station 96 which is the cleanest of all the glass removal operations. Clean liquid then flows over the plate 10 at polishing station 96 so that the lens polishing will not be impaired by any grit or particles in liquid 88. The other stations 92–95 are arranged in a path proceeding toward the liquid outflow to pump 98 in an order of increasing grittiness so that the dirtiest operation is performed at station 92 nearest the outlet to pump 98, and the progressively finer operations are performed toward the clean liquid input from pump 97. Then all flow of grit or waste material is from finer toward coarser operations to protect the work at each station. A filter 99 filters liquid 88 before it is recycled through tank 87. Many different arrangements of pumps, filters, and liquid flow patterns are possible to achieve the general results described above.

FIG. 19 schematically shows one general preferred system for controlling tool motion and location within tank 87 to secure accurate results. The movements and operations of the various tools are all controlled by a master control unit 100 which controls indexing motor 90 for the indexing of fixture stations 89, and preferably automatically controls all tool operations. A control system can be designed to be as sophisticated and automatic as desired, and can accurately control the location and movement of all tools to insure highly accurate lenses. Through numeric control or other motion controlling devices, aspherical lens surfaces can be accurately formed. The control system can also be made less sophisticated and can rely more on the intervention of skilled workers if desired. The choices will depend in part on the lenses to be made, the volume of production, and other factors.

Data elements and control 101 monitor tool positions and respond to positioning control 100 to achieve the accuracy desired. Data elements 101 can be in any of several commerically available forms of motion sensing or monitoring devices, and can be made highly accurate to secure the optical precision necessary for making lenses. Data elements 101 are arranged on X, Y and Z axes of all tools or tool blocks 20 that require precision positioning. Error signals produced by deviation from desired positioning are amplified in error amplifier 102, have their phases determined by phase detector 103, and are applied to servo amplifier 104 for driving servo motors 105 to nullify errors and correct positions. Tool position sensors 106 are positioned and used as desired to determine tool wear and tool starting positions for any operations. Error signals are also fed to oscillator 107 which feeds to resolver 108 which signals through transformer coupling 109 to data elements 101, all under control of master control 100 to achieve the desired results. Also, a source of hydraulic liquid pressure 110 is fed to tool spindles 111 under the control of master control 100 for driving tools until the desired results are achieved.

The control system schematically illustrated in FIG. 19 can be complex and sophisticated, and can require considerable design and development time, but its components, assembly, and operation are within the capacity of those skilled in the art, once the inventive method and its objects are known. Some of the glass removal operations, such as forming annular grooves 23 and coarse generation of lens surfaces need not have especially high precision, and especial care and attention must be paid only to fine generating and grinding and polishing. Tool wear follows repeated patterns during use, and can be anticipated by extrapolation so that tool positioning due to wear need not be checked very often. Otherwise, relatively simple data elements can monitor tool movements and control the result through generally well known servo systems. Also, the inventive method can be practiced even with relatively frequent intervention of a skilled worker to measure and time the on-going work and still can be more efficient than prior art methods.

Those skilled in the art will appreciate the many variables in tool designs, tool motions, mounting fixtures, control systems, and lens designs and shapes including annular rims or spacer rings that can be used in practicing the inventive method. Many different variations in the inventive method all achieve significant operating advantages, including rapid removal of glass, rapid formation of surfaces, greater accuracy than previously possible, economy of materials, high volumes of production, easier handling of materials at different stages of production, capacity to produce many sizes and shapes of lenses, and even the advantage of being able to recycle plates 10 after removal of finished lenses.

Persons wishing to practice the invention should remember that other embodiments and variations can be adapted to particular circumstances, even though one point of view is necessarily chosen in describing and defining the invention, this should not inhibit broader or related embodiments going beyond the semantic orientation of this application but falling within the spirit of the invention.

I claim:
1. A method of making lenses, said mehtod comprising:
   a. forming solid, optical plates thicker than said lenses and having plane opposite face surfaces;
   b. holding said plates relatively still;
   c. moving tools relative to said fixed plates for cutting away annular grooves in one of said face surfaces of said plates to form any necessary clearance for subsequent tool motions;
   d. moving tools relative to said fixed plates and within said annular grooves for cutting away material from said one face surfaces of said plates to form curved surfaces for said lenses, said curved surfaces being recessed relative to said one plane surface of said plate; and
   e. moving tools relative to said fixed plates and within said annular grooves for polishing said curved surfaces of said lenses.

2. The method of claim 1 including repeating steps (b)–(e) for the other of said face surfaces of said plates to form registered opposite curved surfaces for said lenses.

3. The method of claim 1 including simultaneously practicing steps (b)–(e) to form a plurality of said curved surfaces recessed relative to said one plane surface of said plates, and cutting said lenses out of said plates.

4. The method of claim 3 including repeating steps (b)–(e) for the other of said face surfaces of said plates to form registered opposite curved surfaces for said lenses.

5. The method of claim 3 including cutting out said lenses around the outer periphery of said annular groove to leave an annular mounting rim extending radially outward around each of said lenses.

6. The method of claim 3 including cutting out said lenses in a circular cut having a larger diameter than said annular groove to form an annular spacer ring extending radially outward around said groove.

7. The method of claim 1 including adjustably controlling the angle of said tools relative to said curved surfaces during steps (d).

8. The method of claim 1 including dividing step (d) into coarse curve generating, fine curve generating, and fine grinding.

9. The method of claim 3 including inspecting and coating said lenses before cutting said lenses from said plate.

10. The method of claim 1 including forming location surfaces at edge regions of said plates for positioning said plates in fixtures, and indexing said fixtures through a plurality of stations for each of said steps (c)–(e).

11. The method of claim 10 including arranging said fixtures, said plates, and said tools beneath a liquid surface, and flowing liquid over said plates to rinse away waste material.

12. The method of claim 11 including simultaneously practicing steps (b)–(e) to form a plurality of said curved surfaces recessed relative to said one plane surface of said plates, and cutting said lenses out of said plates.

13. The method of claim 12 including repeating steps (b)–(e) for the other of said face surfaces of said plates to form registered opposite curved surfaces for said lenses.

14. The method of claim 12 including flowing said liquid from one of said stations for said polishing toward one of said stations for said cutting away of said material.

15. The method of claim 11 including filtering and recirculating said liquid over said plates.

16. The method of claim 11 including using hydraulic drives for powering said tools.

17. The method of claim 10 including controlling the location and movement of said tools on X, Y, and Z axes.

18. The method of claim 10 including adjustably controlling the angle of said tools relative to said curved surfaces during step (d).

19. The method of claim 10 including using hydraulic drives for powering said tools.

20. The method of claim 13 including using hydraulic drives for powering said tools.

21. The method of claim 13 including filtering and recirculating said liquid over said plates.

22. The method of claim 3 including cutting spacer rings out of said plate from material surrounding each of said lenses.

* * * * *